Figure 1:
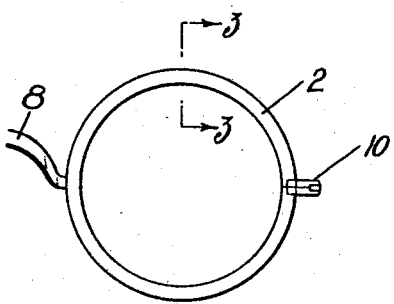

Sept. 21, 1926.  F. A. STEVENS  1,600,605

OPHTHALMIC MOUNTING

Original Filed May 17, 1920

Inventor:
Frederick A. Stevens.
By David Rines
Attorney:

Patented Sept. 21, 1926.

1,600,605

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed May 17, 1920. Serial No. 381,898. Renewed March 16, 1926.

The present invention relates to ophthalmic mountings and more particularly to lens mountings of a now familiar type constituted of a non-metallic rim combined with a reinforcing metal rim.

The non-metallic rim, usually constituted of some composition like zylonite, celluloid or any similar material, may be secured to the metal rim at isolated points, as by means of pins, screws, clips and the like applied at the end pieces of the rims, or the two rims may be secured throughout their length as by swaging the metal into recesses formed in the non-metallic rim or by pressing or otherwise deforming the non-metallic material into firm engagement with the metal rim. If the non-metallic material has been fully cured before mounting upon the metal rim, it is likely to be very brittle, and the attaching elements at the end pieces, by weakening the non-metallic material at those points, are likely to cause breakage. If the non-metallic material has not been fully cured, it will shrink after it has been secured upon the metal rim, and will thus tear itself away from the attaching elements. Whether well cured or not, if the non-metallic material is secured to the metal rim by deformation of either the metal or the non-metallic parts, the resulting strains set up will cause the non-metallic material gradually to shrink away from the metal rim, eventually becoming loose and very objectionable.

In Patent No. 1,293,232, granted February 4, 1919, the above-mentioned difficulties are neatly overcome by momentarily springing away parts of a thoroughly cured non-metallic rim to permit the insertion into a recess therein of a locking rib upon the metal rim, the non-metallic material being sufficiently resilient to permit of this action, and after the metal rim has been forced into place within the non-metallic rim, the non-metallic parts are sprung back into position. The rims are thus securely locked together throughout their length and without subjecting either the metal or the non-metallic parts to permanent strain. A very serviceable and efficient mounting is thus produced, the non-metallic rim remaining in place upon the metal rim through very long periods of time without any hitherto perceivable change of position. A necessary consequence of the method of uniting the rims of the above-mentioned patent, however, is that as the lens is received within a groove in the non-metallic rim, there is so little space left for the reception of the metal rim that the latter must necessarily be of comparatively small thickness and therefore comparatively weak. Owing to this small thickness, furthermore, it is impracticable to form the recess for the locking rib in the metal instead of in the non-metallic material, and the consequent recessing of the latter greatly weakens it.

The object of the present invention, accordingly, is to provide a new and improved ophthalmic mounting of the general character described above that shall be stronger, more durable and cheaper than any heretofore proposed.

With this end in view, a feature of the invention resides in transferring the lens-receiving groove of the above-referred-to patent from the non-metallic rim to the metal rim. Greater space is thereby provided within the non-metallic rim for the reception of the metal rim, and the latter may therefore be made of greater thickness. Owing to this increased thickness, the recess may be formed in the metal rim and the locking rib upon the non-metallic rim, thereby increasing the thickness of the non-metallic rim also. The strength of each individual rim and of the mounting as a whole is thus increased. Incidentally, the process of setting the metal rim into the non-metallic rim is greatly simplified and the cost of manufacture considerably reduced.

Figure 2:
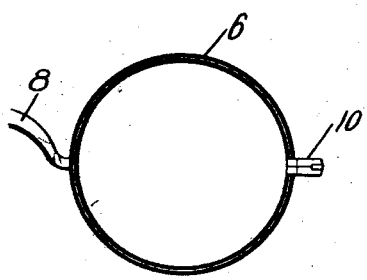
Figure 3:
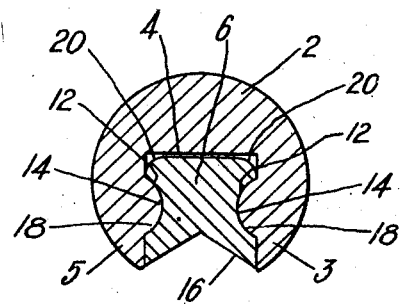
Figure 4:
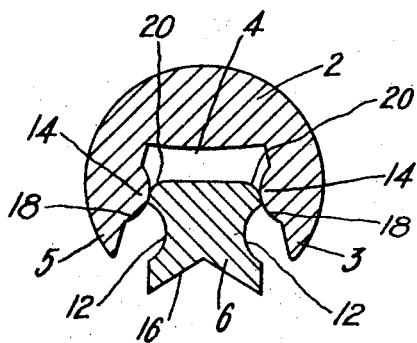

In the accompanying drawings, Fig. 1 is a view of a portion of a spectacle frame constructed according to a preferred form of the present invention; Fig. 2 is a similar view, with the non-metallic rim removed; Fig. 3 is a sectional view taken upon the line 3—3 of Fig. 1; Fig. 4 is a view similar to Fig. 3 illustrating the step of mounting the non-metallic rim upon the metal rim; and Fig. 5 is a similar view illustrating a prior-art construction.

Figure 5:
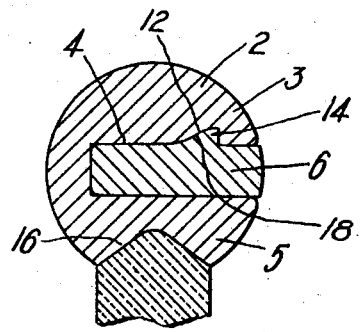

As in the mounting of the above-identified patent, the construction of which is illustrated at Fig. 5, the ophthalmic mounting of the present invention comprises, a non-metallic rim 2 having an annular slot 4 that divides the rim 2 into wings 3 and 5. The slot is substantially oblong in cross section and within it is seated a metal rim 6 to which is secured a bridge 8 of a spectacle or eyeglass frame. A spectacle frame has been chosen to illustrate the invention and accordingly temple end pieces 10 are shown affixed to the ends of the split metal rim 6. The rim 6 is also substantially oblong in cross section and its cross-sectional contour is about the same as that of the slot 4 so that the rim 6 may occupy substantially all the space of the slot 4. A tight joint between the metal and the non-metallic rims is thereby provided. An annular recess 12 is provided upon one of the rims adjacent to an interior wall of the slot and an annular rib 14 that is provided upon the other rim is seated within the recess to lock the rims together. The non-metallic material is sufficiently resilient to adapt the wing 3 to yield or spring outwardly when the metal rim is forced into the slot 4, as shown in Fig. 4, thereby permitting the rib 14 to become seated in the recess 12. The forcing action need be but momentary, the wing 3 immediately springing back into position, upon the rib becoming seated, so that no permanent strain is imposed upon the wing 3 by the operation.

According to the present invention, the lens-receiving groove 16 is provided, not upon the non-metallic rim, as in the said patent, but upon the metal rim 6. Two chief advantages among others result. In the first place, the non-metallic rim is rendered thicker and stronger and so a larger slot 4 may be formed therein for the reception of the metal rim. The metal rim may therefore be made of greater thickness. Not only is the metal rim strengthened in consequence, but, because of the increased metal area, the bridge and the end pieces may become more securely fastened to the metal rim. Secondly, as but the one inner slot 4 need be formed in the non-metallic rim, instead of both a transverse slot and an inner lens-receiving groove, as in the patent, the number of operations performed upon the non-metallic rim and, therefore, its cost of production, become materially reduced. The metal rim, moreover, is more easily inserted into the inner slot 4 than in the corresponding transverse slot of the prior-art construction.

As the metal rim is of greater thickness, the recess 12 may be formed therein instead of in the non-metallic rim. The rib 14 may accordingly be provided upon the latter rim, thereby further strengthening it. Both the metal rim and the non-metallic rim are therefore stronger than in the patented structure and, of course, the mounting as a whole is stronger also.

Not only this, but, owing to the increased thickness of the metal rim and the larger amount of available material provided upon the non-metallic rim, the metal rim may be provided with two oppositely disposed annular recesses 12 instead of only one, and the non-metallic rim with two corresponding oppositely disposed annular ribs 14 projecting inwardly into the slot from the walls thereof. Symmetry of action and a more secure locking effect are thus obtained.

In order to prevent the ribs 14 becoming sheared off during the process of mounting the metal rim in the slot 4, they are preferably formed substantially elliptical in cross section, with the major axis of the ellipse at right angles to the inner wall of the slot. Because of the elliptical contour, furthermore, the portions 18 of the ribs present inclined faces that are adapted to be engaged by similarly inclined or rounded edges 20 upon the face of the metal rim opposite to the lens-receiving groove during the forcing of the metallic rim into the slot 4. The rounded edges slide over the inclined faces 18, thereby further tending to prevent shearing the ribs. The recesses 12 are, of course, of similar shape to the ribs, so as to permit the ribs to seat snugly in the recesses and thereby firmly lock the rims together. The rounded corners 20, moreover, facilitate the insertion of the metallic rim into the slot 4.

A neat, compact, highly efficient and durable mounting is thus provided which is easily manufactured at low cost and the parts of which are very readily assembled. There is no tendency for either rim to pull away in the slightest degree from the other, there can be no breakage due to sharp metal parts biting into brittle non-metallic material and each individual rim and the mounting as a whole is more rigid and stronger than is the case with any ophthalmic mounting of this character heretofore produced.

It will be understood that the invention is not limited to the exact structural details herein shown and described, but that modifications may be made therein within the skill of the artisan without departing from its spirit and scope as defined in the appended claims. The recesses 12 and the ribs interlocking therein need not, for example, be continuous or annular.

The invention having been thus described, what is claimed as new is:

1. An ophthalmic mounting having, in combination, a split rim provided with an inner annular slot, a metal rim seated within the slot having a lens-receiving groove, and means for locking the rims together, one of the rims being constituted of resilient material and adapted to yield when the metal rim is forced into the slot to permit the lock-ing means to become effective.

2. An ophthalmic mounting having, in combination, a rim constituted of resilient material provided with an inner annular slot dividing the rim into resilient wings, and a second rim seated within the slot having a lens-receiving groove, one of the rims having a recess and the other rim having a rib seated within the recess to lock the rims together, one of the resilient wings being adapted to yield when the second rim is forced into the slot to permit the rib to become seated within the recess.

3. An ophthalmic mounting having, in combination, a rim constituted of resilient, non-metallic material provided with an inner annular slot dividing the rim into resilient wings, and a metal rim seated within the slot having a lens-receiving groove, one of the rims having an annular recess adjacent to an interior wall of the slot and the other rim having an annular rib provided with an inclined face seated within the recess to lock the rims together, one of the resilient wings being adapted to yield to permit the rib to become seated within the recess when engaged by the inclined face during the forcing of the metal rim into the slot.

4. An ophthalmic mounting having, in combination, a rim provided with an annular slot substantially oblong in cross section, and ribs projecting inwardly into the slot from the walls thereof, and a metal rim substantially oblong in cross section seated within and occupying substantially all the space of, the slot and having recesses within which the ribs are seated to lock the rims together.

5. An ophthalmic mounting having, in combination, a rim constituted of resilient, non-metallic material provided with an annular slot dividing the rim into resilient wings and with annular ribs projecting inwardly into the slot from the walls thereof, and a metal rim seated within the slot having annular recesses within which the ribs are seated to lock the rims together, one of the resilient wings being adapted to yield when the second rim is forced into the slot to permit the ribs to become seated within the recesses.

6. An ophthalmic mounting having, in combination, a rim constituted of resilient, non-metallic material provided with an inner annular slot dividing the rim into resilient wings and with oppositely disposed annular ribs projecting inwardly into the slot, and a metal rim seated within the slot having a lens-receiving groove and oppositely disposed annular recesses within which the ribs are adapted to be seated to lock the rims together, the wings being adapted to yield when the metal rim is forced into the slot to permit the ribs to become seated within the recesses.

7. An ophthalmic mounting having, in combination, a rim constituted of resilient, non-metallic material provided with an inner annular slot substantially oblong in cross section dividing the rim into resilient wings and with oppositely disposed annular ribs substantially elliptical in cross section projecting inwardly into the slot, and a metal rim substantially oblong in cross section seated within, and occupying substantially all the space of, the slot and having a lens-receiving groove and oppositely disposed annular recesses substantially elliptical in cross section within which the ribs are adapted to be seated to lock the rims together, the edges of the metallic rim upon the face opposite to the lens-receiving groove being rounded to facilitate the insertion of the metal rim into the slot and the wings being adapted to yield when the metal rim is forced into the slot to permit the ribs to become seated within the recesses.

8. An ophthalmic mounting having, in combination, a rim provided with an inner annular slot of varying width, and a second rim seated within and shaped to conform to the slot having a lens-receiving groove, one of the rims being constituted of resilient material and adapted to yield when the second rim is forced into the slot to permit the second rim to become seated within the slot.

9. An ophthalmic mounting having, in combination, a split outer rim constituted of resilient material having annular wings forming between them an inner annular slot, the wings having portions located comparatively far from the body of the rim that are nearer together than other portions located comparatively near to the body of the rim, and a split inner rim seated in the slot and provided with a lens-receiving groove, the surface of the inner rim being shaped to conform to the slot, whereby the nearer-together portions of the wings engage the second rim to hold the rims against separation, the outer rim being initially, prior to its assembly with the inner rim, constructed to retain its shape.

10. An ophthalmic mounting having, in combination, an outer rim having annular wings forming between them an inner annular slot, and an inner rim seated in the slot and enclosed between the wings, the inner rim having a lens-receiving groove, and the outer rim being initially, prior to its assembly with the inner rim, constructed to retain its shape.

11. An ophthalmic mounting having, in combination, an inner rim having a lens-receiving groove and provided with a portion of narrow cross-sectional width, a portion of larger cross-sectional width, and intermediately positioned walls joining the said two portions, and an outer rim having annular wings forming between them an inner annular slot within which the inner rim is seated, the walls of the slot and the exterior surface of the inner rim being shaped to conform to each other, and the outer rim being initially, prior to its assembly with the inner rim, constructed to retain its shape.

In testimony whereof, I have hereunto subscribed my name this 14th day of May, 1920.

FREDERICK A. STEVENS.